3,140,207
PYROTECHNIC COMPOSITION

Mary M. Williams, Santa Monica, and Lohr A. Burkardt, China Lake, Calif., assignors to the United States of America as represented by the Secretary of the Navy No Drawing. Filed Dec. 18, 1962, Ser. No. 245,627
4 Claims. (Cl. 149—19)
(Granted under Title 35, U.S. Code (1952), sec. 266)

The invention described herein may be manufactured and used by or for the Government of the United States of America for governmental purposes without the payment of any royalties thereon or therefor.

The present invention is related to a pyrotechnic composition and method of preparation.

In the past compositions incorporating an iodine-base oxidizer with a suitable fuel have been prepared so that upon combustion or detonation of the composition, either iodine or colored metallic iodides, or both are formed. The general purpose of this invention is to provide a new composition which when ignited results in thermal decomposition giving large yields of silver iodide.

An object of the present invention is the provision of a composition which has use in cloud seeding.

Another object is the provision of a composition which generates larger quantities of finely divided silver iodide than prior art compositions.

A further object is the provision of a castable silver iodide producing composition which makes for ease in handling.

Other objects and features of this invention will become apparent to those skilled in the art as the disclosure is made in the following description.

The invention contemplates the incorporation of silver iodate with a combustible binder to form a castable composition. The composition when ignited decomposes producing minutely divided silver iodide.

The formulations used in this invention consisted of about 30% binder, 50 to 70% silver iodate and 0 to 20% aluminum. The binder in most of the formulations consisted of 30% plastisol grade nitrocellulose (PNC) and 70% pentaerythritol tetranitrate (PETN). Other nitrate esters such as nitroglycerin, metriol trinitrate, triethylene glycol dinitrate, etc., may be used. The ratio of plastisol nitrocellulose to nitrate ester varies with the particular lot of nitrocellulose and nitrate ester chosen. This ratio is determined experimentally.

The plastisol nitrocellulose contains ethyl centralite as a stabilizer and for long-term storage other stabilizers such as resorcinol may be added.

The formulations are easily made by first preparing the binder which comprises blending plastisol nitrocellulose and a nitrate ester in a vacuum mixer at room temperature until a homogeneous bubble-free mixture is obtained. The binder may be stored for later use, or the mix may be completed by adding the desired amounts of silver iodate and aluminum. Vacuum mixing is continued and when a homogeneous bubble-free mixture is obtained, the material is cast into the desired form and oven cured. The optimum time and temperature for cure depends upon the particular lot of plastisol nitrocellulose and the nitrate ester, and must be determined for each new lot. The temperature and time of cure also depends upon the size and shape of the casting. For example, a cylinder one-inch in diameter and one-inch long may be expected to cure in 1 to 2 hours at a temperature ranging from 130° to 180° F.

The ratio of binder to solid additives (silver iodate and aluminum) is determined by the oxygen balance and the particle size of the iodate. The particle size of the silver iodate should result in a mix viscosity which is castable but which will not permit the silver iodate to settle out. The iodate used in the formulations tested was 100% through 40 mesh and 100% retained on 200 mesh.

The following examples of the formulations are given in the chart below to more particularly illustrate the invention. However, the invention is not to be considered as limited to the examples.

| Ingredients | Composition, Weight Percent | | | |
|---|---|---|---|---|
| | Example I | Example II | Example III | Example IV |
| Plastisol nitrocellulose (PNC) | 9.0 | 9.0 | 9.0 | 9.0 |
| Pentaerythritol tetranitrate (PETN) | 21.0 | 21.0 | 21.0 | 21.0 |
| Silver Iodate (AgIO$_3$) | 70.0 | 60.0 | 55.0 | 65.0 |
| Aluminum (Al) | 0 | 10.0 | 15.0 | 5.0 |

Friction sensitivity tests were conducted on the above formulations and Examples I, II, and IV containing 0, 5 and 10% aluminum, respectively, gave ten no fires out of ten tests with an 8.8 kg. wt. at 50 cm. The 15% aluminum mixture (Example III) gave three fires out of fifteen tests under the same conditions.

In static electricity tests all the formulations gave ten tests at 5000 v. and 1µf. capacitance.

The detonability of the formulation is similar to that of cast TNT.

The differential thermal analysis of the compositions disclosed herein shows the initial exotherm of all the nitrate ester systems beginning roughly at 180° C. and peaking around 200° C. The height of the exotherm is reduced somewhat by the addition of aluminum. Further heating shows slow decomposition of silver iodate to silver iodide.

The cook off time for the unmetalized formulation (Example I) was 3.1 hours at 250° C. For Examples II, III and IV, containing 10, 15 and 5% aluminum, respectively, the cook off time was found to be 2.4, 2.2 and 3.3 hours at 245° C.

A product evaluation of these formulations was made. Small samples (50 to 100 grams) were ignited and a portion of the combustion products drawn through a vacuum filter and the solid material collected on clean glass and ceramic surfaces. These samples were examined microscopically and by X-ray defraction methods. No free iodine was found and only minute traces of free silver. The aluminum was found mostly as an ash of aluminum oxide in the ignition area.

Obviously many modifications and variations of the present invention are possible in the light of the above teachings. It is therefore to be understood that within the scope of the appended claims the invention may be practiced otherwise than as specifically described.

What is claimed is:

1. A pyrotechnic composition comprising the following constituents:

| Constituent— | Percent by weight |
|---|---|
| Binder | 30 |
| Silver iodate | 50 to 70 |
| Aluminum | 0 to 20 | said binder consisting essentially of a mixture of about 30 percent by weight nitrocellulose and about 70 percent by weight of a member selected from the group consisting of pentaerythritol tetranitrate, metriol trinitrate, triethylene glycol dinitrate and glyceryl trinitrate.

2. A pyrotechnic composition comprising the following constituents:

| Constituent— | Percent by weight |
|---|---|
| Binder | 30 |
| Silver iodate | 50 to 70 |
| Aluminum | 0 to 20 | said binder consisting essentially of a mixture of the following:

| Constituent— | Percent by weight |
|---|---|
| Nitrocellulose | 30 |
| Pentaerythritol tetranitrate | 70 |

3. A pyrotechnic composition consisting essentially of the following constituents:

| Constituent— | Percent by weight |
|---|---|
| Nitrocellulose | 9 |
| Pentaerythritol tetranitrate | 21 |
| Silver iodate | 55 to 70 |
| Aluminum | 5 to 15 |

4. A pyrotechnic composition consisting essentially of the following constituents:

| Constituent— | Percent by weight |
|---|---|
| Binder | 30 |
| Silver iodate | 70 | said binder consisting essentially of a mixture of the following:

| Constituent— | Percent by weight |
|---|---|
| Nitrocellulose | 30 |
| Pentaerythritol tetranitrate | 70 |

References Cited in the file of this patent

UNITED STATES PATENTS

| 1,478,892 | Davis | Dec. 25, 1923 |
| 2,902,355 | Eckels | Sept. 1, 1959 |
| 3,084,084 | D'Alelio | Apr. 2, 1963 |